(12) United States Patent
Suzuki et al.

(10) Patent No.: US 6,245,982 B1
(45) Date of Patent: Jun. 12, 2001

(54) PERFORMANCE IMAGE INFORMATION CREATING AND REPRODUCING APPARATUS AND METHOD

(75) Inventors: Hideo Suzuki; Tsuyoshi Miyaki; Yoshimasa Isozaki; Satoshi Sekine, all of Hamamatsu (JP)

(73) Assignee: Yamaha Corporation

( * ) Notice: Subject to any disclaimer, the term of this patent is extended or adjusted under 35 U.S.C. 154(b) by 0 days.

(21) Appl. No.: 09/400,573

(22) Filed: Sep. 21, 1999

(30) Foreign Application Priority Data

Sep. 29, 1998 (JP) ................................... 10-274996
Mar. 23, 1999 (JP) ................................... 11-077547

(51) Int. Cl.[7] .............................. G09B 15/02; G10H 7/00
(52) U.S. Cl. ......................... 84/477 R; 84/609; 84/610; 84/634; 84/649; 84/650
(58) Field of Search ..................... 84/600–606, 609–612, 84/626, 634–636, 649–652, 666–668, 470 R, 477 R, 478, 662, DIG. 6; 345/473, 474; 348/155, 399

(56) References Cited

U.S. PATENT DOCUMENTS 5,083,201 1/1992 Ohba .
5,159,140 10/1992 Kimpara .
5,890,116 * 3/1999 Itoh et al. ................................ 84/651

FOREIGN PATENT DOCUMENTS 4-155390 5/1992 (JP) .
5-73048 3/1993 (JP) .

* cited by examiner

Primary Examiner—Robert E. Nappi
Assistant Examiner—Marlon Fletcher
(74) Attorney, Agent, or Firm—Morrison & Foerster

(57) ABSTRACT

Image information representing a manner of playing a piece of music can be diplayed while playing the piece of music. Performance image information is created, which enables displaying an image showing a manner of playing a piece of music while playing the piece of music. A motion component database is created, which comprises a plurality of motion components each created for each musical instrument or each part and stores a trajectory of a fraction of motion of a player and a musical instrument in one of at least one performance method being typical of the each musical instrument or the each part. Motion descriptive information is created, which designates one of the motion components corresponding to performance information on the piece of music to be played and a designated one of the at least one performance method, on a time schedule determined by a predetermined musical time unit of the piece of music to be played. Sequence information is created, which comprises the motion descriptive information, and the performance information. The designated one of the motion components can be edited, and the edited motion component is stored in the motion component database.

24 Claims, 12 Drawing Sheets

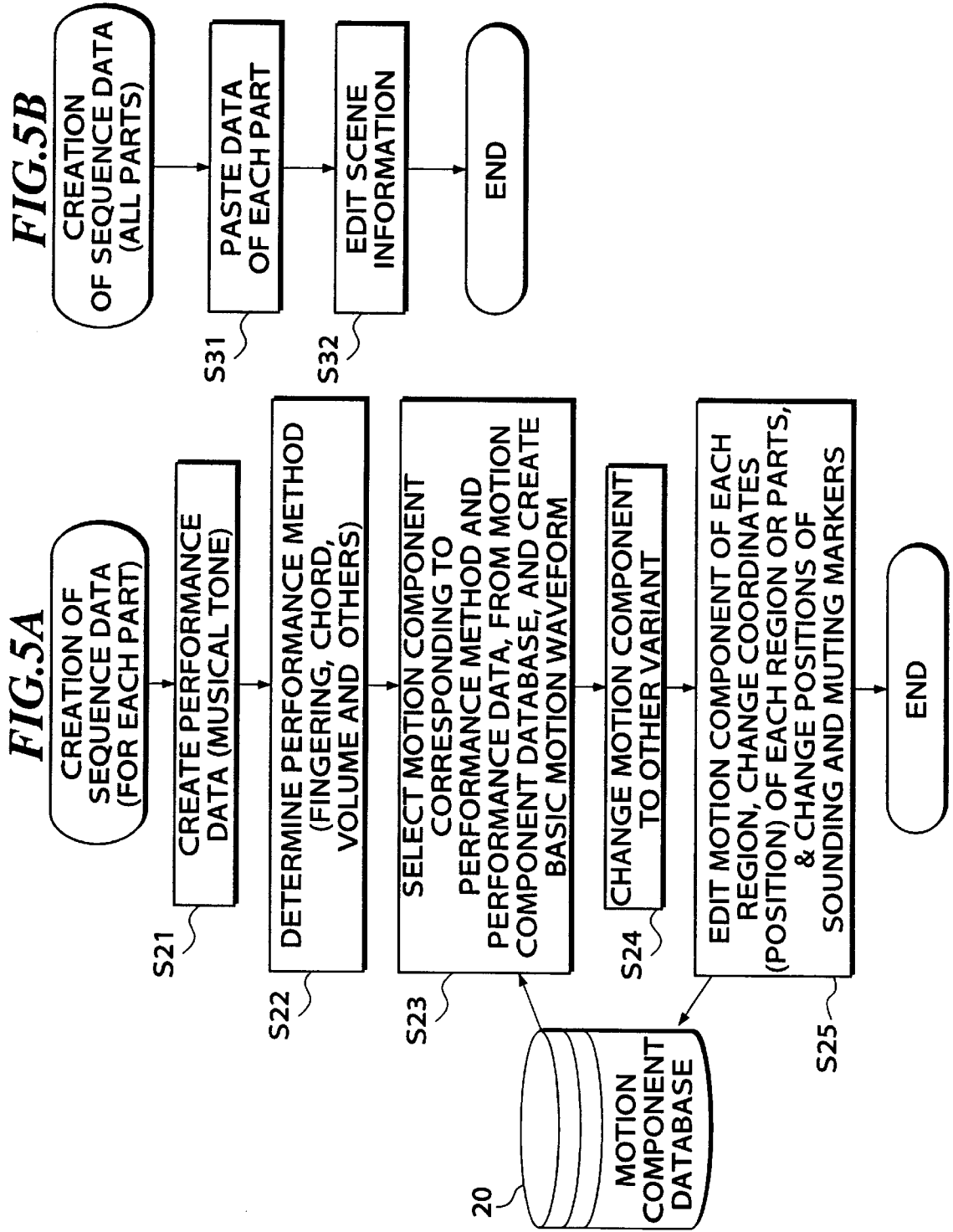

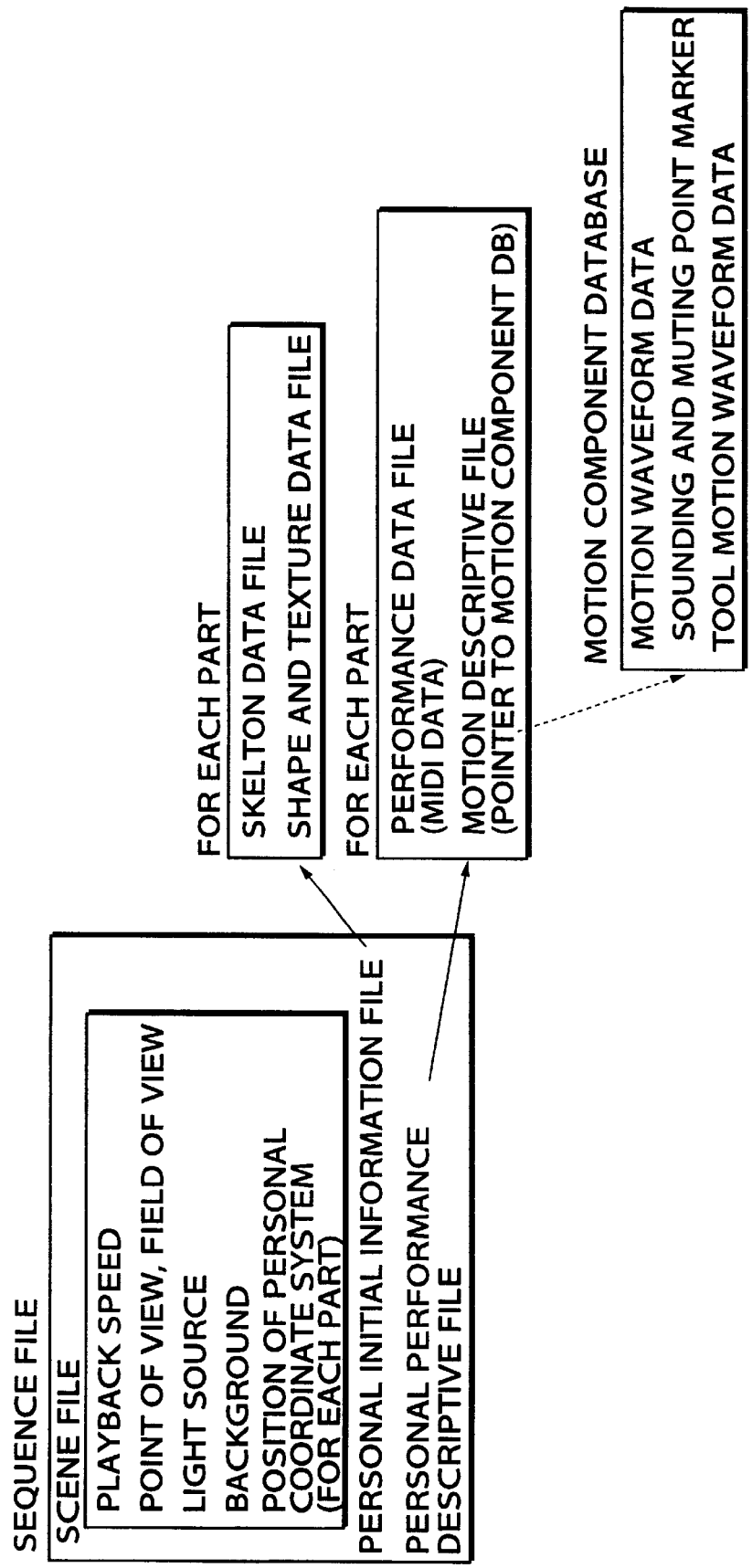

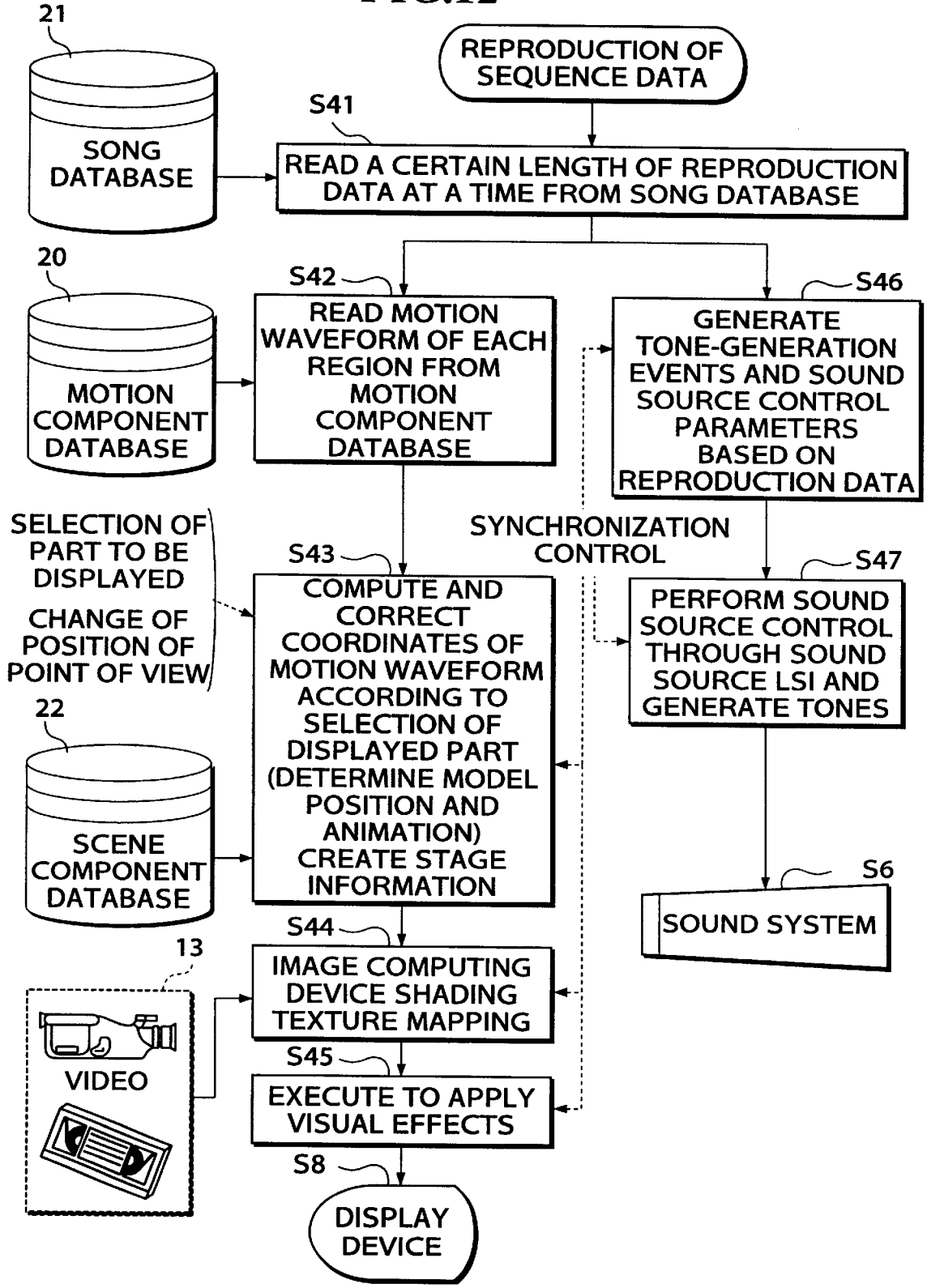

PERFORMANCE IMAGE INFORMATION CREATING AND REPRODUCING APPARATUS AND METHOD

BACKGROUND OF THE INVENTION

1. Field of the Invention

The present invention relates to performance image information creating apparatus and method, and performance image information reproducing apparatus and method, for creating, editing and reproducing performance information and image information including images showing the manner of playing a piece of music represented by the performance information, and also relates to a storage medium storing a program or programs that implement these methods.

2. Prior Art

An application program, which is also called "multimedia authoring tool", is known which is adapted to paste or attach two-dimensional images or animation in accordance with a piece of music, using a general-purpose computer, such as a personal computer.

The images displayed along with a piece of music according to the application program as described above are still pictures or those represented by two-dimensional (2D) image data, but three dimensional (3D) image data cannot be displayed using the above application program.

Further, in editing displayed images, it is not easy to edit such images in accordance with playing or performance of a piece of music.

It is also difficult to completely synchronize displayed images with playing of a piece of music. For example, display of images cannot be easily changed in synchronism with a change in the tempo of playing of a piece of music, and visual effects cannot be easily applied to images to be displayed, in synchronism with playing of a piece of music.

SUMMARY OF THE INVENTION

It is therefore a first object of the present invention to provide performance image information creating apparatus and method, and performance image information reproducing apparatus and method, which are capable of displaying image information representing a manner of playing a piece of music while playing the piece of music, and to provide a storage medium storing a program for implementing these methods.

It is a second object of the invention to provide performance image information creating apparatus and method, and performance image information reproducing apparatus and method, which are capable of editing images in accordance with a piece of music, and to provide a storage medium storing a program for implementing these methods.

It is a third object of the invention to provide performance image information creating apparatus and method, and performance image information reproducing apparatus and method, which are capable of reproducing images or applying visual effects to images that are displayed, in synchronism with playing or performance of a piece of music.

In a first aspect of the present invention, there is provided a performance image information creating apparatus for creating performance image information for displaying an image showing a manner of playing a piece of music while playing the piece of music, comprising a motion component database comprising a plurality of motion components each created for each musical instrument or each part and storing a trajectory of a fraction of motion of a player and a musical instrument in one of at least one performance method being typical of the each musical instrument or the each part, a motion descriptive information creating device that creates motion descriptive information that designates one of the motion components corresponding to performance information on the piece of music to be played and a designated one of the at least one performance method, on a time schedule determined by a predetermined musical time unit of the piece of music to be played, and a sequence information creating device that creates sequence information comprising the motion descriptive information, and the performance information.

Preferably, the predetermined musical time unit is defined by beats of the piece of music to be played, or by bars or measures of the piece of music to be played.

Preferably, the motion descriptive information creating device includes an editing device that edits the designated one of the motion components, and stores a result of editing in the motion component database as an edited motion component.

Preferably, the motion components each comprise recorded information on the trajectory of the fraction of motion of at least one of each part of a body of the player and each part of the musical instrument.

Preferably, the motion components each comprise a motion waveform representing the trajectory of the fraction of motion, a sounding point marker indicative of timing of tone generation, and a muting point marker indicative of timing of tone elimination.

Preferably, the performance image information creating apparatus according to the invention further includes a time resolution setting device that individually sets time resolutions of waveforms of motion of the motion components.

Also preferably, the performance image information creating apparatus according to the first aspect of the invention further includes a scene information creating device that creates scene information comprising scene components including at least background information and light source information in the image, the scene components being arranged on the time schedule, and wherein the sequence information comprises the performance information, the motion descriptive information, and the scene information.

More preferably, the scene components include information for instructing information externally entered to be displayed.

In the first aspect of the invention, there are also provided a method of creating performance image information for displaying an image showing a manner of playing a piece of music while playing the piece of music, comprising the steps of creating a motion component database comprising a plurality of motion components each created for each musical instrument or each part and storing a trajectory of a fraction of motion of a player and a musical instrument in one of at least one performance method being typical of the each musical instrument or the each part, creating motion descriptive information that designates one of the motion components corresponding to performance information on the piece of music to be played and a designated one of the at least one performance method, on a time schedule determined by a predetermined musical time unit of the piece of music to be played, and creating sequence information comprising the motion descriptive information and the performance information, and a storage medium storing a program that is executable by a computer to practice a method of creating performance image information for displaying an image showing a manner of playing a piece of music while playing the piece of music, the program comprising a module for creating a motion component database comprising a plurality of motion components each created for each musical instrument or each part and storing a trajectory of a fraction of motion of a player and a musical instrument in one of at least one performance method being typical of the each musical instrument or the each part, a module for creating motion descriptive information that designates one of the motion components corresponding to performance information on the piece of music to be played and a designated one of the at least one performance method, on a time schedule determined by a predetermined musical time unit of the piece of music to be played, and a module for creating sequence information comprising the motion descriptive information and the performance information.

In a second aspect of the present invention, there is provided a performance image information creating apparatus for creating performance image information for displaying an image in synchronism with playing of a piece of music while playing the piece of music, comprising an information creating device that creates information comprising instruction information arranged on a time schedule determined by a predetermined musical time unit of the piece of music to be played, for instructing image information externally entered to be displayed, and a sequence information creating device that creates sequence information comprising the information created by the information creating device, and performance information on the piece of music to be played.

Preferably, the predetermined musical time unit is defined by beats of the piece of music to be played, or by bars or measures of the piece of music to be played.

Preferably, the instruction information includes information for controlling visual effects to be applied to the image information externally entered.

Preferably, the performance image information creating apparatus according to the second aspect of the invention further includes a motion descriptive information creating device that creates motion descriptive information comprising designation information arranged on the time schedule, for designating one of a plurality of motion components each storing a trajectory of a fraction of motion of a player and a musical instrument, the one of the plurality of motion components corresponding to the performance information and a performance method being typical of the musical instrument, and wherein the sequence information comprises the information comprising the instruction information, and the motion descriptive information.

In the second aspect of the invention, there are also provided a method of creating performance image information for displaying an image in synchronism with playing of a piece of music while playing the piece of music, comprising the steps of creating information comprising instruction information arranged on a time schedule determined by a predetermined musical time unit of the piece of music to be played, for instructing image information externally entered to be displayed, and creating sequence information comprising the information created by the step of creating information, and performance information on the piece of music to be played, and a storage medium storing a program that is executable by a computer to practice a method of creating performance image information for displaying an image in synchronism with playing of a piece of music while playing the piece of music, the program comprising a module for creating information comprising instruction information arranged on a time schedule determined by a predetermined musical time unit of the piece of music to be played, for instructing image information externally entered to be displayed; and a module for creating sequence information comprising the information created by the module for creating information, and performance information on the piece of music to be played.

In a third aspect of the invention, there is provided a performance image information reproducing apparatus for generating musical tones corresponding to performance information and displaying an image showing a manner of playing a piece of music represented by the performance information, based on sequence information comprising the performance information, and motion descriptive information used for displaying the image showing the manner playing the piece of music, comprising a musical tone generating device that generates the musical tones based on the performance information, an image creating device that creates the image showing the manner of playing the piece of music corresponding to the performance information, based on the motion descriptive information, and a motion component database comprising a plurality of motion components each created for each musical instrument or each part and storing a trajectory of a fraction of motion of a player and a musical instrument in one of at least one performance method being typical of the each musical instrument or the each part, wherein the image creating device reads out the motion components from the motion component database, based on the motion descriptive information, and creates the image using the motion components read from the motion component database.

Preferably, the image creating device creates the image to be displayed, by correcting skeleton data indicative of sizes of the player and the musical instrument contained in each of the motion components, based on information contained in the sequence information, for designating a size of the image to be displayed.

Preferably, the performance image information reproducing apparatus according to the third aspect of the invention further includes an input device that enters image information from an external device, an image synthesizing device that synthesizes an image based on the image created by the image creating device and an image based on the image information entered by the input device, and an effects-applying device that applies visual effects to at least one of the image created by the image correcting device, the image based on the image information entered by the input device, and the image synthesized by the image synthesizing device, in timing determined by a predetermined time unit of the piece of music being played, based on the sequence information.

In the third aspect of the invention, there are also provided a method of reproducing performance image information for generating musical tones corresponding to performance information and displaying an image showing a manner of playing a piece of music represented by the performance information, based on sequence information comprising the performance information, and motion descriptive information used for displaying the image showing the manner playing the piece of music, comprising the steps of generating the musical tones based on the performance information, creating the image showing the manner of playing the piece of music corresponding to the performance information, based on the motion descriptive information, and creating a motion component database comprising a plurality of motion components each created for each musical instrument or each part and storing a trajectory of a fraction of motion of a player and a musical instrument in one of at least one performance method being typical of the each musical instrument or the each part, wherein the step of creating the image reads out the motion components from the motion component database, based on the motion descriptive information, and creates the image using the motion components read from the motion component database, and a storage medium storing a program that is executable by a computer to practice a method of reproducing performance image information for generating musical tones corresponding to performance information and displaying an image showing a manner of playing a piece of music represented by the performance information, based on sequence information comprising the performance information, and motion descriptive information used for displaying the image showing the manner playing the piece of music, the program comprising a module for generating the musical tones based on the performance information, a module for creating the image showing the manner of playing the piece of music corresponding to the performance information, based on the motion descriptive information, and a module for creating a motion component database comprising a plurality of motion components each created for each musical instrument or each part and storing a trajectory of a fraction of motion of a player and a musical instrument in one of at least one performance method being typical of the each musical instrument or the each part, wherein the module for creating the image reads out the motion components from the motion component database, based on the motion descriptive information, and creates the image using the motion components read from the motion component database.

According to the present invention constructed as above, images showing the manner of playing a piece of music can be displayed in synchronism with the performance of a piece of music.

Also, the present invention makes it easy to edit images showing the manner of playing a piece of music.

Further, the present invention makes it possible to display actual images that are obtained by actually shooting an object or objects and input from external devices, in synchronism with the performance of a piece of music and also apply effects to images that are displayed, in synchronism with the performance of a piece of music, to thereby enhance the performance effect.

Since the motion components are contained in the database, common motion components can be used with respect to a plurality of performance methods (performance techniques) and pieces of music, and necessary components can be added to the database, thus assuring an improved efficiency with which images are created.

Furthermore, a motion component includes a sounding point marker indicative of the timing of tone generation and a muting point marker indicative of the timing of tone elimination, as well as the motion waveform, thus making it possible to use common motion components upon changes in the tempo, for example, which results in a reduced size of the database.

The above and other objects, features, and advantages of the invention will be more apparent from the following detailed description taken in conjunction with the accompanying drawings.

BRIEF DESCRIPTION OF THE DRAWINGS

FIGS. 4A to 4C are views useful in explaining creation of motion components in which FIG. 4A shows a manner of acquiring information on the motion of a player, FIG. 4B shows a case where the motion of a musical instrument is recorded, more specifically, where the swinging motion of a cymbal is recorded, and FIG. 4C shows a phrase to be played, with three positions indicated therein as representing sounding or tone-generation points, together with respective elapsed times t, t', t" from the start of performance;

FIGS. 5A and 5B are a flowchart showing a process of creating sequence information, in which FIG. 5A is a flowchart showing the process of creating sequence information for each part, and FIG. 5B is a flowchart showing a process of integrating sequence information of all of the parts and making overall adjustments thereof;

FIG. 11 is a view showing the configuration of a sequence file; and

FIG. 12 is a flowchart showing a sequence information reproducing operation.

DETAILED DESCRIPTION OF THE PREFERRED EMBODIMENT

One preferred embodiment of the present invention will be described in detail with reference to the drawings.

Figure 1:
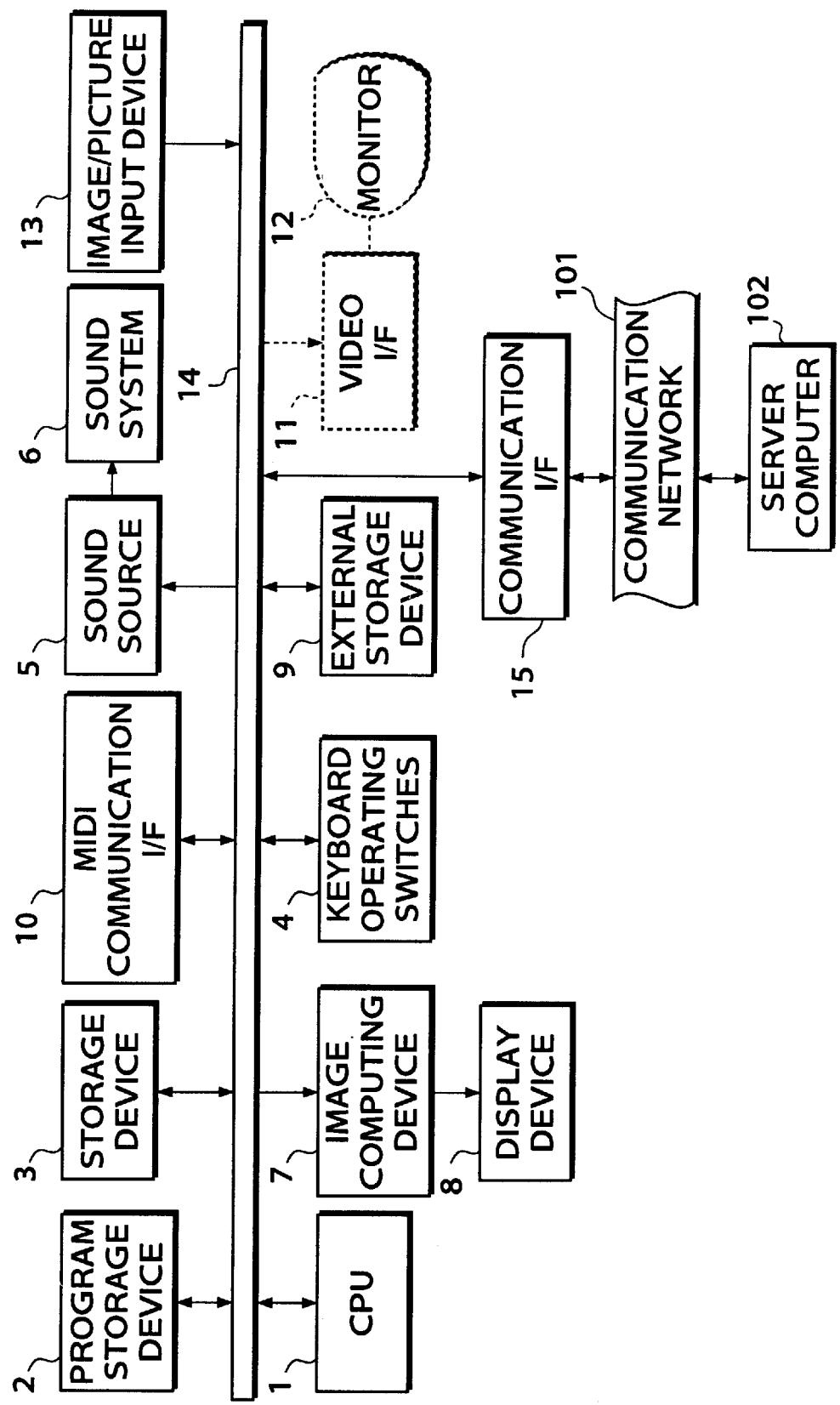
FIG. 1 is a block diagram showing a performance image creating apparatus and a performance image reproducing apparatus according to one embodiment of the present invention.

FIG. 1 is a block diagram showing the construction of an apparatus that operates as a performance image creating apparatus as well as a performance image reproducing apparatus as one embodiment of the present invention. In FIG. 1, the apparatus includes a central processing unit (CPU) 1 that controls the operations of the whole apparatus, a program storage device 2 that stores control programs according to which the present apparatus is controlled, and a storage device 3 that is composed of ROM, RAM and others to be used as work areas, and stores sequence data (sequence information) created by means of this apparatus, a motion component database containing components each representing the trajectory of a performance motion or action in each performance method (performance technique), a scene component database containing scene components, such as background information and light source information, and various other data. The present apparatus further includes a keyboard and a set of operating switches 4 that include various manipulable parts provided on an operating panel, and a sound source unit 5 that generates musical tone signals to be transmitted through a plurality of channels. The sound source unit 5 may be of any type selected from, for example, waveform memory type, FM type, physical model type, harmonic synthesis type, formant synthesis type, and analog synthesizer type of VCO+VCF+VCA. The sound source unit 5 is not limited to a sound source circuit consisting of a dedicated hardware, but may be a sound source circuit constructed using DSP and a microprogram, or may be constructed by means of the CPU 1 and a software program. The sound source unit 5 also includes an effect processing portion that applies various effects, such as vibrato and reverberation, to musical tones generated. The apparatus further includes a sound system 6 that emits the musical tones generated from the sound source unit 5.

The apparatus of the present embodiment also includes an image computing device (drawing engine) 7 for generating 3D image data and applying various visual effects to images that are displayed, and an image display device (graphic display) 8 for displaying 3D images generated by the image computing device 7, and an edit screen that will be described later. Alternatively, the CPU 1 may be used to execute image processing without using the image computing device 7.

In FIG. 1, reference numeral 9 denotes an external storage device, such as a hard disc, floppy disc, CD-ROM, MO, and DVD, and 10 denotes a MIDI interface circuit that enables communications with external MIDI equipment. Reference numeral 15 denotes a communication interface (I/F) that enables sending or receiving of data to or from a server computer 102, for example, through a communication network 101.

The apparatus of the present embodiment further includes a video interface circuit 11 adapted for displaying an image showing the manner of playing music on a monitor 12 as external equipment connected to the apparatus, an image/picture input device 13 that inputs image or picture signals from external devices such as television cameras and video tape recorders (VTRs), and a bus 14 that permits data transmission between the components as indicated above.

The hard disc (HDD) mounted in the external storage device 9 may store control programs to be executed by the CPU 1. Where a certain control program is not stored in the ROM of the storage device 3, the hard disc may store the control program, which is read into the RAM of the storage device 3 so that the CPU 1 can perform the same operations as in the case where the control program is stored in the ROM. In this manner, a new control program can be easily added, or an existing program that has been already installed can be easily upgraded.

A control program or various data may be read from a CD-ROM of the external storage device 9, and stored to a hard disc mounted in a hard disc drive (HDD). In this manner, a new control program can be easily installed, or an existing program can be easily upgraded.

The communication I/F 15 is connected to the communication network 101, such as LAN (Local Area Network), Internet, or a telephone line, so as to be connected to the server computer 102 via the communication network 101. In the case where a certain program or a certain set of parameters is not stored in the hard disc within the HDD, the communication I/F 15 may be used for downloading the program or parameters from the server computer 102. A client computer (i.e., performance image creating apparatus and performance image reproducing apparatus in the present embodiment) sends a command to the server computer 102 via the communication I/F 15 and communication network 101, to request downloading of a desired program or parameters. Upon receipt of the command, the server computer 102 delivers the requested program or set of parameters to the client computer, through the communication network 101. The client computer then receives the program or set of parameters through the communication I/F 15, and stores it to the hard disc in the HDD. In this manner, downloading is accomplished.

The apparatus of the present embodiment constructed as described above includes a motion component database containing motion components in which the trajectories of fractions of the motion of a player or a musical instrument in a typical performance method are recorded, for each musical instrument or part. The performance image creating apparatus then reads out motion components corresponding to performance information and a designated performance method, from the motion component database, and creates or edits motion descriptive information indicative of the manner of playing the piece of music, based on the motion components, so as to generate sequence information containing the performance information and the motion descriptive information. Also, the performance image reproducing apparatus reads out desired motion components from the motion component database, based on the motion descriptive information contained in the sequence information, generates or displays corresponding images, and reproduces or displays the generated images or images input from an external device, in synchronism with the performance of the piece of music.

Motion Component Database

The motion component database will be now described in detail.

The motion component database is created by capturing, for each of various musical instruments or parts, the trajectory of motion of a player and a musical instrument in a performance method which is typical of the musical instrument or part, as motion capture data, resolving the motion trajectory of each part of the body of the player or each part of the instrument (hereinafter called "region"), into those of the X, Y and Z-axis directions, and marking the timing of tone generation and tone elimination (beat position in the case of a drum, for example), onto the motion capture data. Each of components of the motion trajectory in the X, Y and Z-axis directions resulting from the resolving of the motion trajectory is called "motion waveform" and the data representing the fractions of performance motion are called "motion components".

Figure 2:
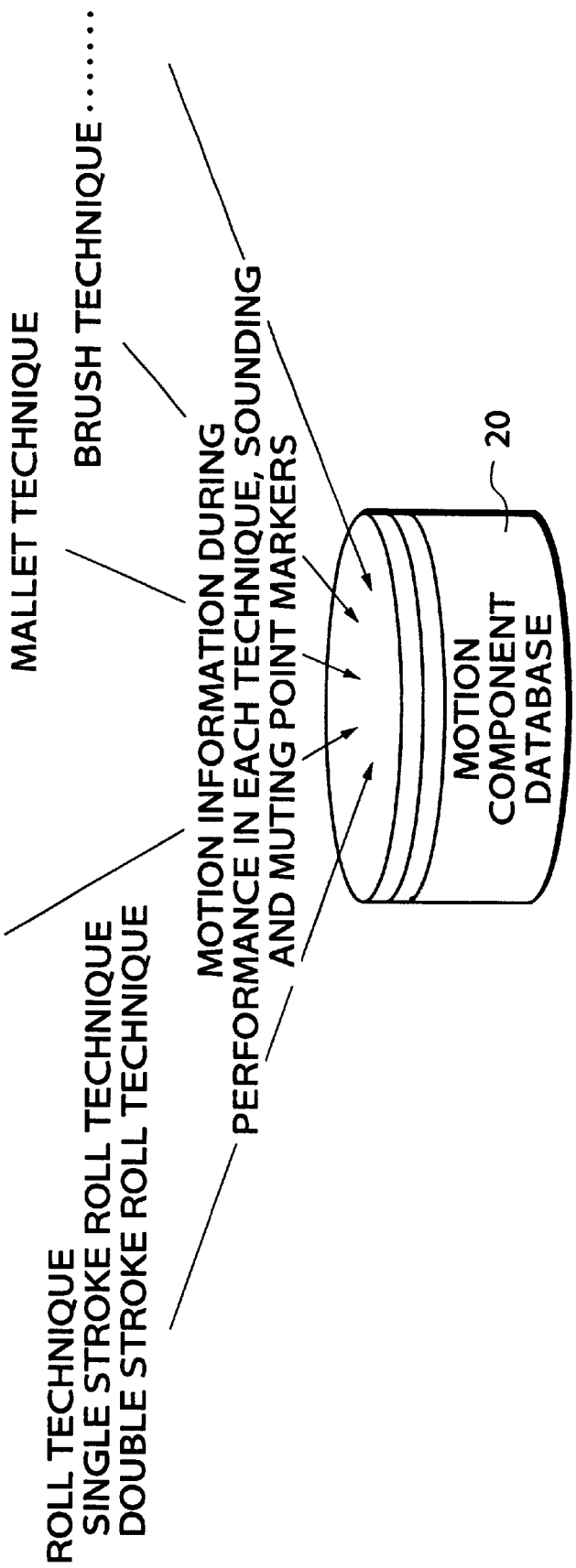
FIG. 2 is a view useful in explaining a motion component database.

FIG. 2 shows an example of motion components of a drum part. As well known in the art, typical performance methods of the drum include a roll technique (single stroke, double stroke), a rim shot technique (closed rim shot, open rim shot), and a technique using a mallet or a brush. As shown in FIG. 2, each motion component is comprised of data including motion waveforms indicative of the trajectory of the motion of the player and musical instrument exhibited when a short performance pattern is played with each technique, and sounding and muting point markers indicating the timing of tone generation and tone elimination. In the drum part as illustrated in this example, motion waveforms of a plurality of instruments, such as cymbals, a snare drum and a bass drum, constitute one motion component. In the case of a musical instrument, such as a piano or a saxophone, a motion component is produced for each instrument.

Figure 3:
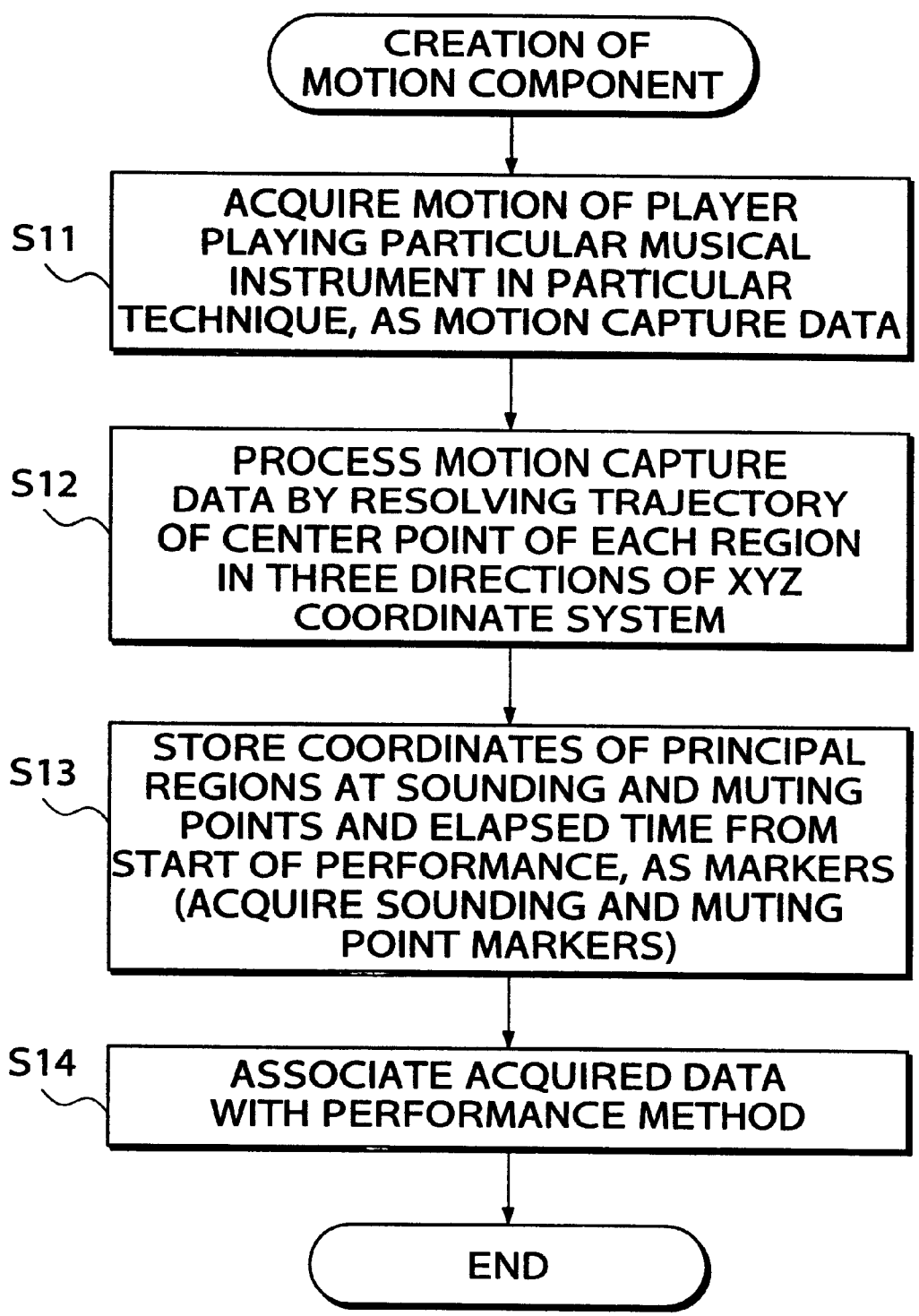
FIG. 3 is a flowchart useful in explaining a process of creating a motion component.

A method of creating the motion components will be now described with reference to the flowchart of FIG. 3. Step S11 is initially executed to acquire, as motion capture data, the motion or action of a player and the motion of a particular musical instrument when the player plays the instrument in a particular performance technique or method.

Figure 4C:
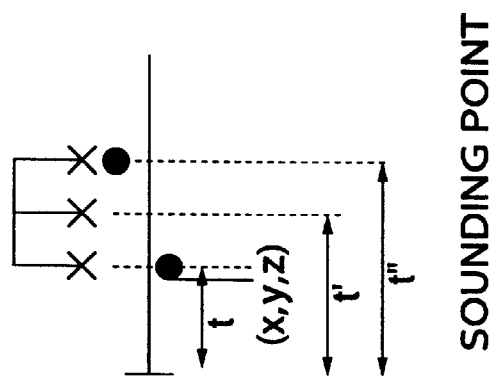
Figure 4B:
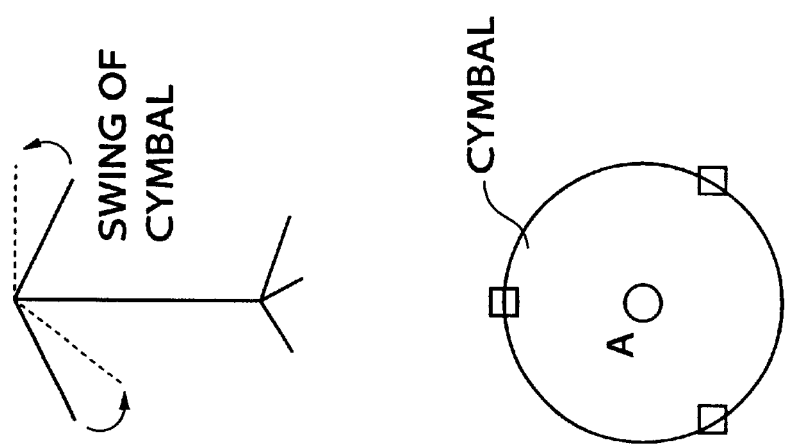
Figure 4A:
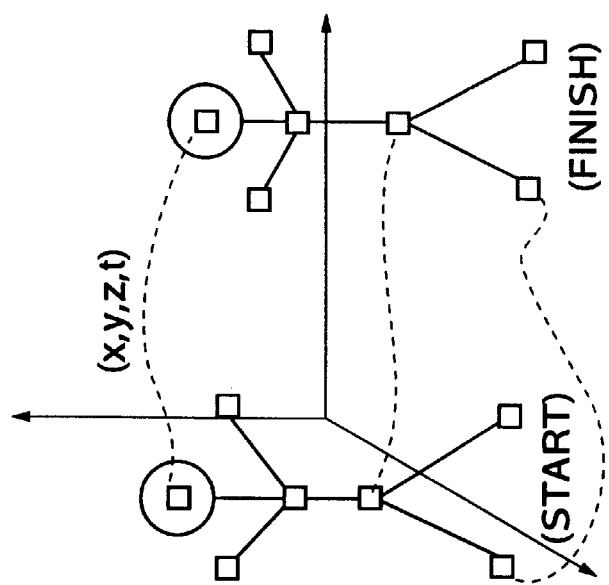

FIG. 4A shows the manner of acquiring information on the motion of a player. As shown in FIG. 4A, a player, who is equipped with 3D digitizers on principal parts (indicated by squares) of his/her body, is caused to play a particular pattern (a fraction of performance) using a particular performance technique, and the motion of the body of the player during the performance is recorded. The 3D digitizers may be magnetic or optical ones as known in the art. FIG. 4B shows the case where the motion of a musical instrument is recorded, more specifically, where the swinging motion of a cymbal is recorded. In this case, the swinging motion of the cymbal is recorded through motion capturing, using three 3D digitizers mounted on certain positions of the cymbal as indicated by squares in FIG. 4B.

In step S12, the motion capture data obtained in step S11 is processed by resolving the trajectory of the center point of each region on an XYZ coordinate system, to provide a motion waveform indicating the moving state and position of each region. At the same time, time data may also be recorded. In the above example of the cymbal, the motion waveform of the region consists of the motion waveform of the center position A of the above three points that are regarded as lying on the same plane on which A is located. Skeleton size information indicative of dimensions or sizes of the player and/or the musical instrument on which the motion capture data are obtained is also recorded.

The control flow then goes to step S13 to store markers (that will-be called "sounding point markers" and "muting point markers") that determine coordinates of principal regions at which a tone is generated (sounding point) and a tone is eliminated (muting point), and a period of time elapsed from a point of time when its performance is started. Where a phrase as shown in FIG. 4C is to be played, for example, three positions as indicated in the figure represent sounding or tone-generation points, and respective elapsed times t, t', t" from the start of the performance are stored distinguishably. The sounding point markers and muting point markers may be of any type provided that they can specify the timing of tone generation and tone elimination within a set of motion waveform data (x, y, z, t) acquired as described above.

The control flow then goes to step S14 in which the data acquired in the manner as described above are associated with the performance method used for giving the performance. At this time, data of closely related regions, for example, the right arm, shoulder, elbow, and the knuckle of each finger, are stored as combined data of set parts. The operator may change the combination of the set parts, or resolve data of the set parts into those of individual parts.

In the above manner, data are contained in the database such that appropriate data can be retrieved in accordance with a change in the position (change in the shape or size of the player and musical instrument) upon reproduction thereof, or a change in the time (or tempo).

For example, the motion components relating to the drum are stored such that each component represents the motion of the player or instrument from the time when the player hits each kit to the time when he/she stops hitting the kit. More specifically, a motion component covers the motion of a player raising a stick, hitting a cymbal with the stick, and raising the stick again. Here, the sounding point is defined as the point of time when the stick touches the cymbal. The muting point, though it is not necessarily provided, may be defined as the point of time when the cymbal stops vibrating.

In the case of a piano, a motion component covers the motion of a player placing one finger or a combination of fingers on the keyboard, and releasing the same from the keyboard. In this case, the sounding point is defined as the point of time when the finger(s) comes into contact with the keyboard, and the muting point is defined as the point of time when the finger(s) is released from the keyboard. A plurality of variations of motion components are prepared, from which an appropriate one is selected depending upon the degree of spreading the fingers and the states of the remaining fingers. For typical chords to be played with three or more fingers, a plurality of variations of motion components are prepared from which an appropriate one is selected depending upon the manner of using the fingers to play a desired chord or the degree of spreading the fingers.

The motion component may further include data representing the moving velocity or acceleration of each region, in addition to each data of the XYZ coordinates and time and skeleton size, and the sounding and muting point markers. Further, the motion component may further include data relating to the shape of the player and/or the shape and texture of the musical instrument.

Creation of Sequence Information

Next a process of creating sequence information (sequence data) as described above will be explained.

FIGS. 5A and 5B are a flowchart showing the process of creating sequence data. As shown in FIGS. 5A and 5B, the creation of sequence information roughly consists of a process of creating sequence data for each part, and a process of creating sequence data of all parts by synthesizing or integrating the created sequence data of respective parts.

FIG. 5A is a flowchart showing the process of creating sequence data for each part.

Once the process of creating sequence data for each part is started, step S21 is executed to create performance information. This operation is similar to an operation to compose a piece of music using a known sequence software. With this operation, performance information (MIDI data) of the part in question is created.

The control flow then goes to step S22 to determine a performance method with which the piece of music composed in step S21 is played by the part in question. In step S22, the performance method is determined for each selected region on a score corresponding to the performance information. If the part in question is a keyboard part, for example, information on chords, fingerwork or fingering, volume and others is entered. In the case of a drum part, the name of performance method to be used is entered.

Since motion components corresponding to the above information are read out from the motion component database 20 as described above, the operator is instructed to enter information required for retrieving motion waveforms of regions from the motion component database 20, depending upon the musical instrument or part selected by the operator.

Once all necessary information is entered, step S23 is then executed to select and read out motion components corresponding to the performance information and performance method entered in the previous steps, from the motion component data 20, create a basic motion waveform to be edited, and generate a 3D image representing the manner of playing the piece of music based on the basic motion waveform, which image is then displayed on a screen. First of all, a player that is initially set in advance to the musical instrument or part is displayed along with the musical instrument corresponding to tone color information designated in the performance information of the piece of music.

If the operator is not satisfied with the player or musical instrument of the basic motion waveform, step S24 is executed to change it to another player or musical instrument. As to the musical instrument, however, top priority is given to the information relating to the musical instrument that is designated in the performance data of the music piece. Where the information designates the use of a grand piano, for example, it is possible to change the color of the grand piano from black to woodgrain or transparent in graphics, but it is not possible to change the grand piano into an upright piano or other musical instrument in a different category. Upon changing of the player or musical instrument, available choices of player and musical instrument may be displayed on the screen each time the operator wishes to change it, thus assuring improved operating efficiency.

After the player and musical instrument are thus determined, the operator reproduces the basic motion waveform from the first one to the last one thereof, and, if he/she is not satisfied with the basic waveform, editing operations as described below will be performed.

More specifically, the control flow goes to step S25 to perform image editing operations, such as editing of the motion waveform for each region, alteration of coordinates (position) of each region or parts, and alteration of the position of sounding and muting point markers. Also, if the operator could not select a desired player or musical instrument in step S24, the control flow goes to step S25 to edit the waveform by directly reading out appropriate motion components.

Figure 6:
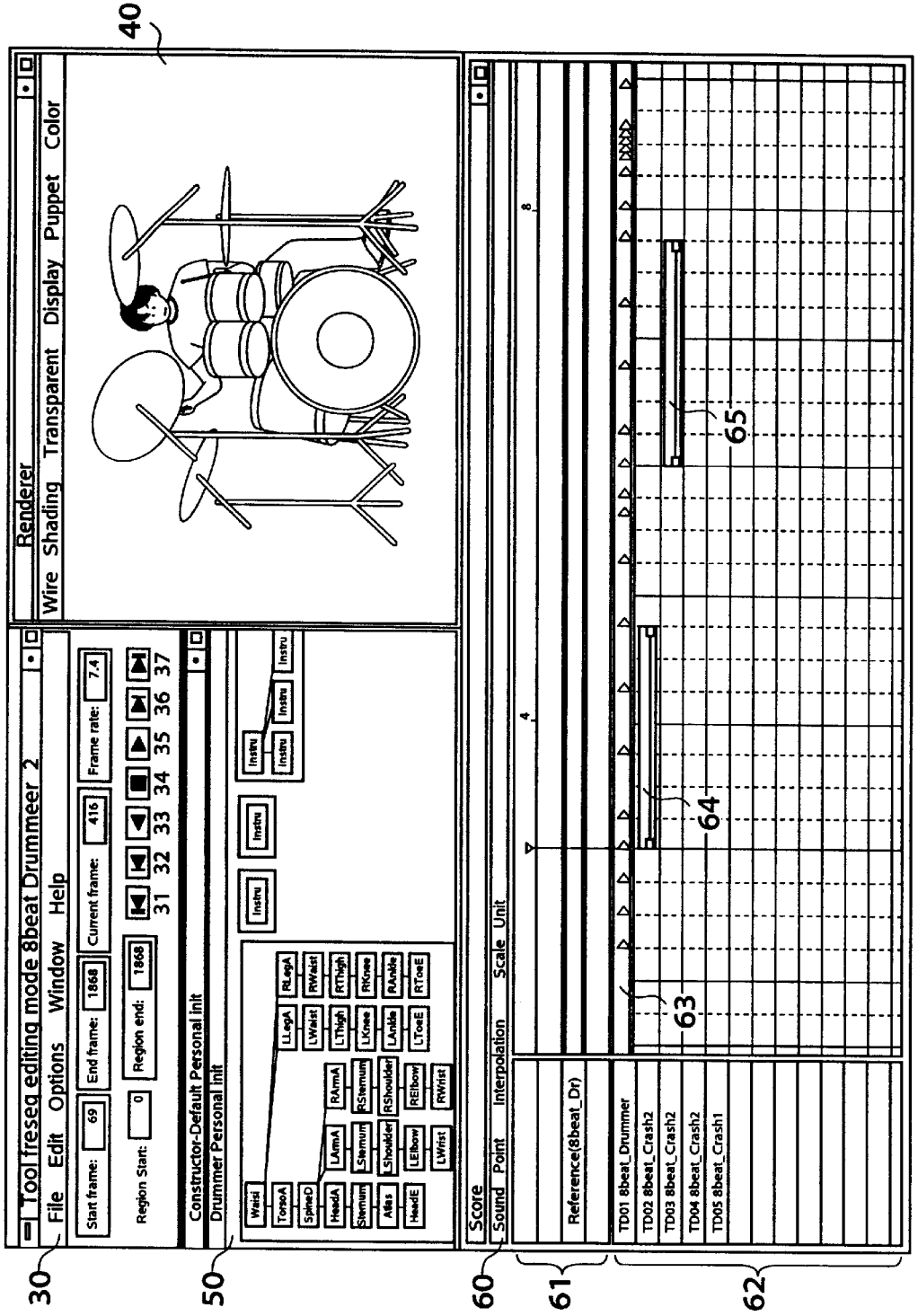
FIG. 6 is a view illustrating one example of image edit screen for each part.
Figure 7:
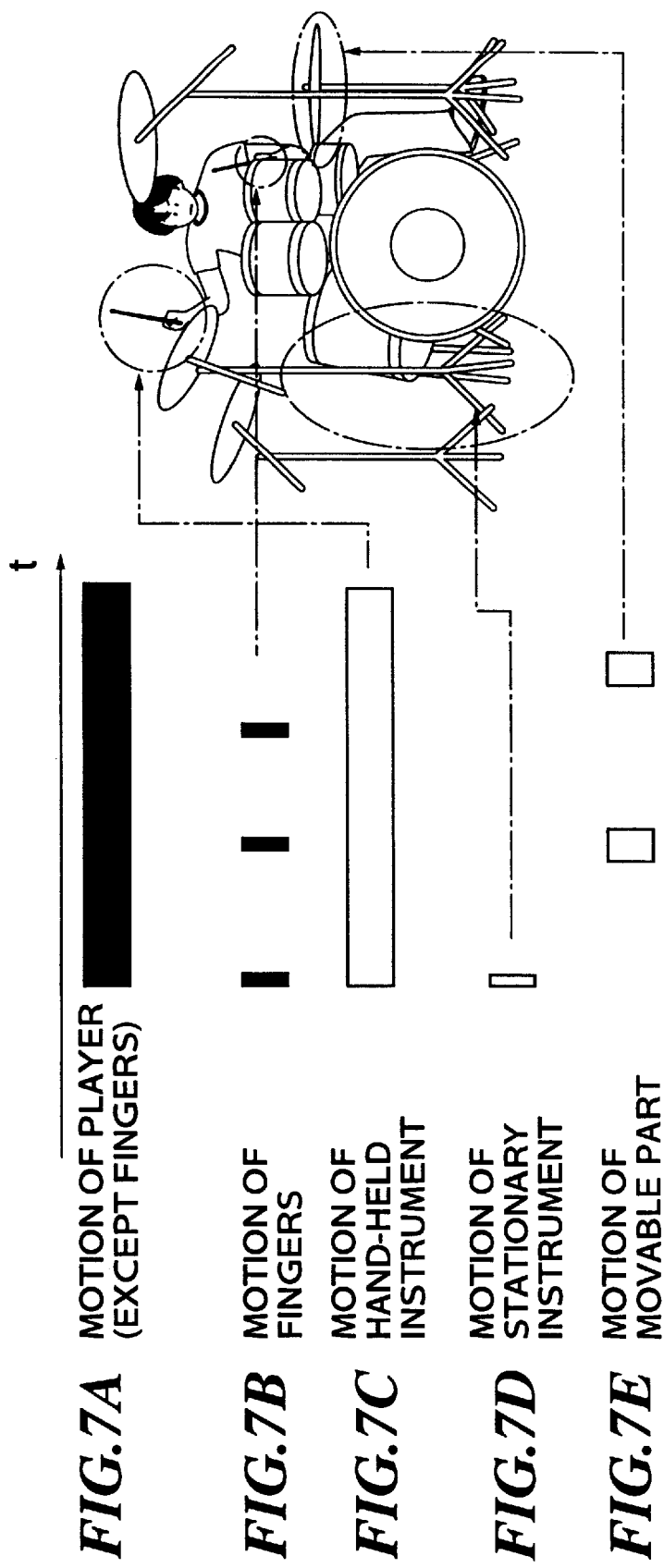
FIGS. 7A–7E are views useful in explaining synthesis of a plurality of motion components.

FIG. 6 shows an image edit screen, by way of example, that is displayed on the display device 8 when the above steps S23–S25 are executed. As shown in FIG. 6, the image edit screen includes four windows, i.e., a control window 30, an image display window 40, a region selection information window 50, and a parts/region display information window 60. The control window 30 displays control buttons to be operated to play back or rewind a series of images, and the frame position of image data to be edited. The image display window 40 displays a 3D graphic image representing the manner of playing music. The region selection information window 50 displays respective regions of the player and musical instrument being displayed, in a hierarchical structure, to enable the operator to select a desired one of the regions. The parts/region display information window 60 displays the time schedule of the motion components for each parts or region.

Here, the control buttons provided in the control window 30 include a button 31 for returning to the top or initial position of the series of images, a button 32 for returning to a previous image one measure before the current image, a reverse playback button 33, a stop button 34, a forward playback button 35, a button 36 for forwarding or advancing to an image one measure ahead of the current image, a button 37 for forwarding to the last position of the series of images. Thus, the operator is able to control reproduction of the 3D images in the image display window 40 by operating a selected one of these buttons.

In step S23, the player and musical instrument selected by the operator are displayed in the image display window 40. As initial information for displaying the player and musical instrument, the skeleton size data and shape and texture data as indicated above are used. The operator is able to select a certain region of the image player and musical instrument displayed in the image display window 40, and shift the position of the selected region, to thereby establish a new position of this region. The selection of the region of the player or musical instrument may also be made by selecting region display information in the region selection information window 50. Such a region that is located behind another region and is thus difficult to select from the image displayed on the screen may be selected from the region selection information, so that this region can be displayed in the image display window 40 to allow selection thereof. The coordinates of the motion waveform may also be automatically changed at the same time that the position of the region is established.

In the region selection information window 50, respective regions that constitute the motion components are displayed along with their hierarchical structure, thus allowing the operator to select one of the regions displayed in this window. In the example illustrated in FIG. 6, respective regions of the drum player and drum set are displayed in a hierarchical arrangement.

The parts display information window 60 includes a section 61 that displays performance information of the part in question, and a section 62 that displays the time schedule of each parts.

Once the motion waveforms of the part are created with respect to a piece of music, the time schedule for each parts as a set of motion components is displayed on the basis of, for example, beat as a unit time. In FIG. 6, broken vertical lines in the section 62 represent beats, and solid lines represent bars or measures. The motion waveform of each parts is located at the position where the motion waveform is used within the time schedule of the part, with reference to beats as a unit.

In FIG. 6, reference numeral 63 denotes the time schedule of a parts that is a drummer in this case, and 64 and 65 denote the motion waveform of each parts relating to the musical instrument. Each motion waveform is displayed in the form of a rectangle, and, if it contains sounding point markers, the position of each marker is denoted by a triangle that points to the right. In the example of FIG. 6, the parts 63 includes a stick, for example, and the positions of the sounding point markers are displayed. Thus, the performance information of the piece of music that has been already entered is displayed with respect to individual parts, so that the timing of generating and eliminating tones by each parts can be confirmed on the screen. If the sounding and muting point markers of the motion waveform are caused to match the timing of tone generation and tone elimination, musical tones can be generated and eliminated in synchronism with tone-generating (sounding) and tone-eliminating (muting) motions in the performance image.

The playback rate of a motion waveform of each parts can be changed by selecting a rectangle representing the motion waveform of the parts, and changing the length of the rectangle. For example, the playback rate may be reduced by increasing the length. The playback rate may also be automatically changed when the tempo of the piece of music in question is changed.

Further, a straight line having opposite rectangular ends is displayed within a rectangle of each motion waveform, and this straight line represents a portion of the motion waveform that is used for actually reproducing the image. By changing the length and position of the straight line, the portion in the motion waveform that is used for reproducing the image may be selected. The length of the straight line is changed in accordance with changes in the length of the rectangle as indicated above. Also, the lengths of the straight lines and rectangles are changed on the basis of a predetermined musical time unit such as beats and bars or measures.

By selecting the rectangle of each motion waveform, each region contained in the parts may be selected within the image display window 40. This makes it possible to change the motion waveform of each region to any of other variants or candidates, and edit the motion waveform itself.

It is also possible to change the number of frames used for each region, with the upper limit being defined as the number of frames obtained though motion capturing. Thus, the number of frames can be increased with respect to regions where subtle movements take place, and reduced with respect to regions that do not move so much, thus reducing a load or burden on the apparatus upon computing.

Referring next to FIGS. 7A–7E, synthesis of motion waveforms of regions of a drum part will be explained by way of example. For the drum part, five types of motion waveforms are used which include waveforms of (7A) the motion of the body of a player except fingers, (7B) the motion of the fingers, (7C) the motion of hand-held parts or tools (drum sticks) of the instrument, (7D) the motion of stationary parts of the instrument, and (7E) the motion of movable parts of the instrument. In this case, the motion of the player (7A) and the motion of the sticks (7C) are regarded as a set parts, for which a large number of frames are used. On the other hand, the motion of the fingers (7B), the motion of stationary parts of the instrument (7D), and the motion of movable parts of the instrument (7E) do not require a high resolution, and therefore the number of frames for these types of motion is reduced as shown in FIGS. 7A–7E.

Furthermore, the motion waveform can be directly edited.

Figure 8:
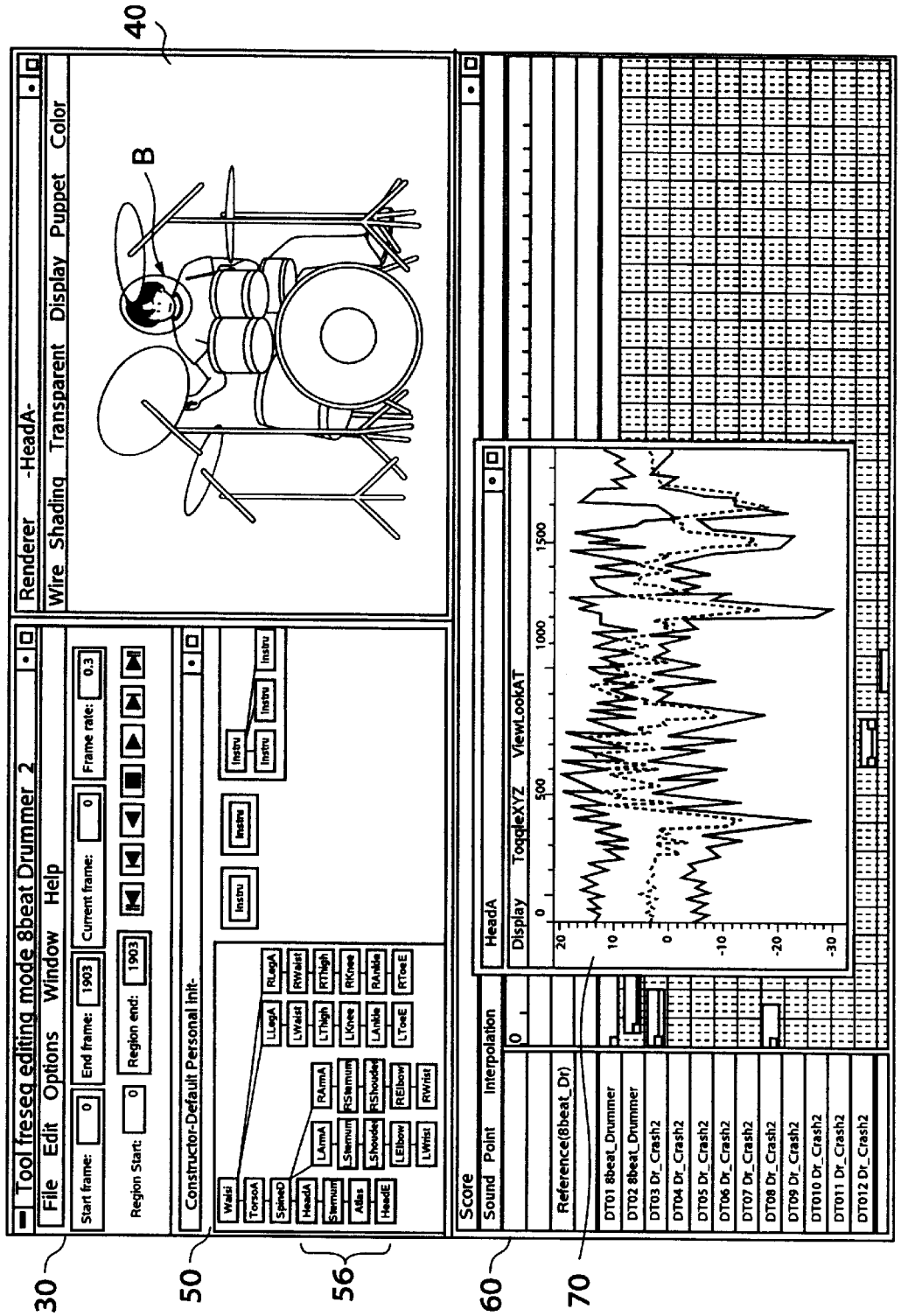
FIG. 8 is a view illustrating one example of edit screen on which motion components are edited.

FIG. 8 shows the manner of directly editing the motion waveform. In this example, the motion waveform of the region "head (Head A)" is to be edited. If the region "Head A" to be edited is selected in the region selection information window 50 or the image display window 40, the region "Head A" and other regions subordinate to the "Head A" (as denoted by 59 in FIG. 8) which will be influenced by the result of editing of the "Head A" are indicated in a different form (for example, reversed color) than the other regions in the region selection information window 50. At the same time, the selected region and the regions subordinate to the selected region (namely, the regions that are governed or restricted by the selected region) in a 3D image displayed in the image display window 40 are displayed in a different display form (for example, with higher brightness) than the other regions, as indicated by B in FIG. 8. If the operator designates a selected region by double-clicking, for example, a motion waveform display window 70 as shown in FIG. 8 appears on the screen, and the motion waveform of the region is displayed in the window 70. The motion waveform shown in FIG. 8 is that of Head A, which indicate the angle of a vector directed from its subordinate region "Sternum" to the "Head A" with respect to the initial coordinate position of the "Head A". In the motion waveform display window 70 of FIG. 8, the horizontal axis indicates the number of frames, and the vertical axis indicates the angle, while three lines represent angles measured from the X axis, Y axis and the Z axis, respectively.

If the operator changes the position of the region to be edited in the image display window 40, the motion waveform of this region is automatically changed. If the motion waveform displayed in the motion waveform display window 70 is edited, to the contrary, the 3D image displayed in the image display window 40 makes a motion in accordance with the result of editing of the motion waveform.

In the above manner, the motion waveform can be directly edited. The editing of the motion waveform is useful when it is desired to smoothly join two or more types of motion that are synthesized or combined together, for example.

After the motion waveform are edited in the above manner, a certain name may be give to the motion waveform of the region thus edited, and added to the motion waveform database 20. It is also possible to sequentially synthesize or combine two or more types of motion waveform of a certain region, or divide the motion waveform into two or more types, and newly add the results of the synthesis or division to the motion waveform database 20. Once a motion file indicative of the manner of performance of this part is determined, the name of the motion file, pointers (instrument information, performance method) and other information are automatically stored in association with performance information.

After sequence data of each part is created in the above manner, the process of FIG. 5B of integrating sequence data of all of the parts and making overall adjustments thereof is implemented. This process is carried out using a screen as shown in FIG. 9 for editing data relating to all of the parts.

Once the process of FIG. 5B is started, step S31 is executed to paste or attach data of each part onto the edit screen. In this step, each part is designated, and data of the designated part is located on the time schedule along with musical tones and images.

Figure 9:
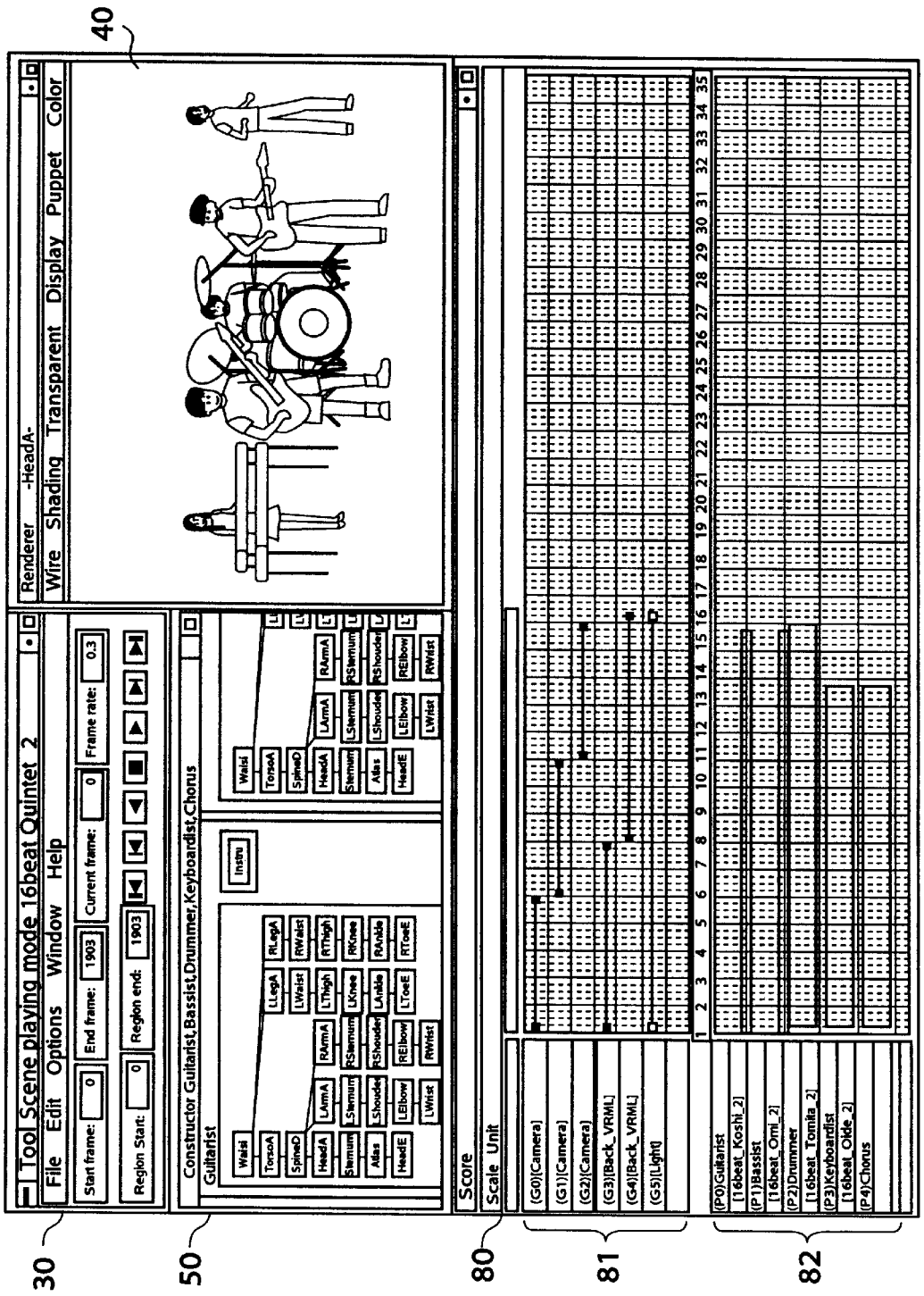
FIG. 9 is a view illustrating one example of image edit screen for each part.

In FIG. 9, reference numeral 80 denotes a window in which the time schedule of all parts is displayed. The window 80 includes a section 81 in which is located scene information relating to a stage, and a section 82 that displays data of each part. In the window 80, vertical dotted lines represent beats, and solid lines represent bars or measures, and each part information is located on the absolute measures and beats established in one piece of music. It is to be noted that the beats and measures shown in the edit screen of FIG. 6 and FIG. 8 for editing data of each part are determined relative to the starting point of the part in question.

The control flow then goes to step S32 to perform an editing operation of scene information. As described above, the scene component database is stored in the storage device 3, and the scene component database contains various types of scene components used for forming an image relating to a performance stage, including background information, light source information and camera (point of view) information. In step S32, desired scene components, such as background information, camera (point of view) information and light source information, are selected from the scene component database, and pasted onto the section 81 of the window 80 on the time schedule defined by beats and measures. In the example of FIG. 9, three items of camera information G0–G2, two items of background information G3 and G4 and light source information G5 are pasted on the time schedule. These scene components are described in, for example, VRML (Virtual Reality Modeling Language).

Further, control information including a image(s) obtained by actually shooting an object or objects (hereinafter called "actual image(s)") and input from the image/picture input device 13 such as a television camera or VTR and motion picture files prepared by a computer is also stored as scene components in the scene component data for use as background information. The input actual images may be displayed as the background or displayed on a desired display region as a part of the background, for example. Moreover, an object may be shot against a background of a single color such as blue to obtain an actual image or computer graphics (CG) may be implemented to extract a color or colors other than the background from an actual image or a CG image and paste the extracted color(s) onto an image or synthesize a CG image and an actual image with a desired transmission factor (chromakey synthesis). In this manner, an image based upon the motion waveform may be synthesized with a background of an actual image or with a background of a player(s) of other musical instrument(s) as a scenic element, to thereby display the player in question playing together with a CG player on the screen.

Alternatively, an actual image alone may be displayed. For example, an actual image may be inserted in an introduction or an intermezzo so as to enhance the performance effect.

Control information for taking in such actual images, which is also a scene component, is pasted on the time schedule determined by a musical time unit such as beats and bars or measures, similarly to other scene components.

Further, effects-applying processes for applying effects to an image may be adopted as scene components. If such a scene component is pasted on the time schedule, various visual effects can be applied to an image displayed on the monitor, which is obtained by synthesizing the actual image and the image generated as above, such as fade-in, fade-out, or wipe at the time of change of the point of view of the image or at the time of change of the background, changing part of the displayed image into a mosaic pattern, and changing the color tone into a sepia tone. The scene components relating to these effects-applying processes may be registered in the scene component database in the form of functions, making it possible to add desired image processing.

As in the case of the parts as described above, the scene components may be edited, for example, by selecting a desired one of the scene components on the time schedule of the section 81, and changing the length of the selected scene component. It is also possible to select a certain scene component or scene information pasted in the section 81, so as to display detailed information of this component and edit any item of the detailed information.

A piece of music completed in the above manner may be played back, rewound or forwarded at a certain selected region or regions thereof. It is also possible to assign a song name to the music piece, and store it with the name.

Figure 10A:
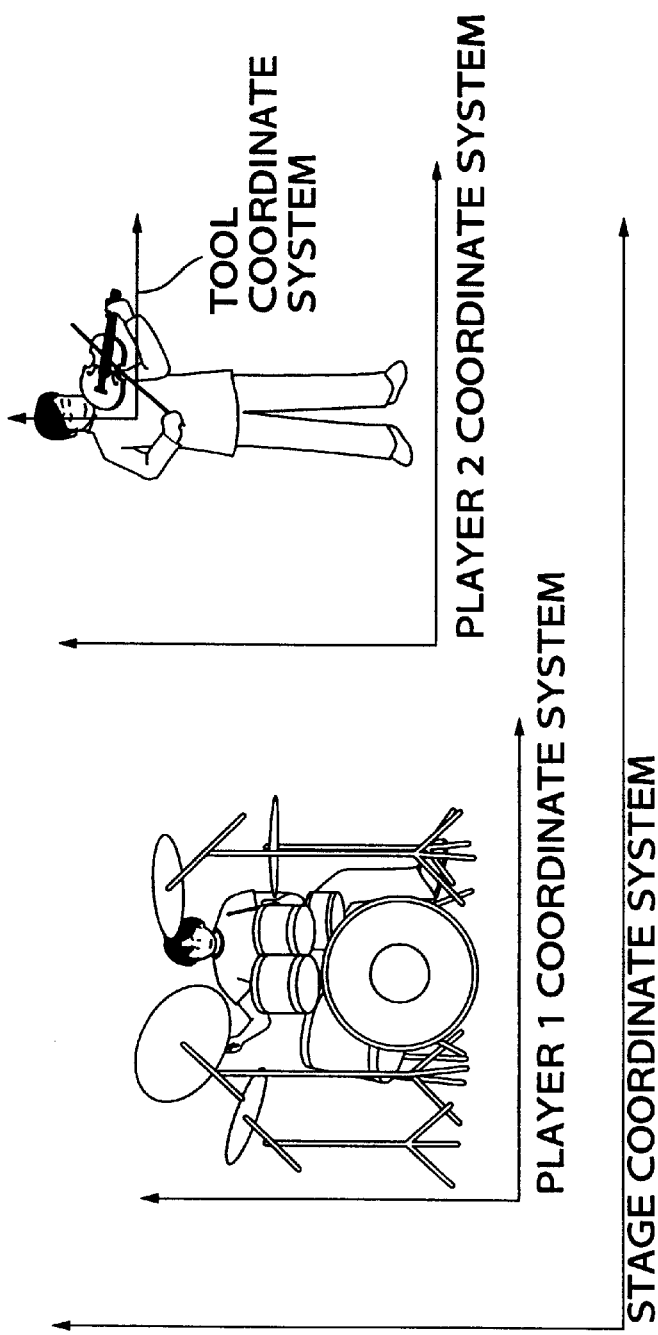
FIGS. 10A and 10B are view useful in explaining synthesis of information on a plurality of parts.
Figure 10B:
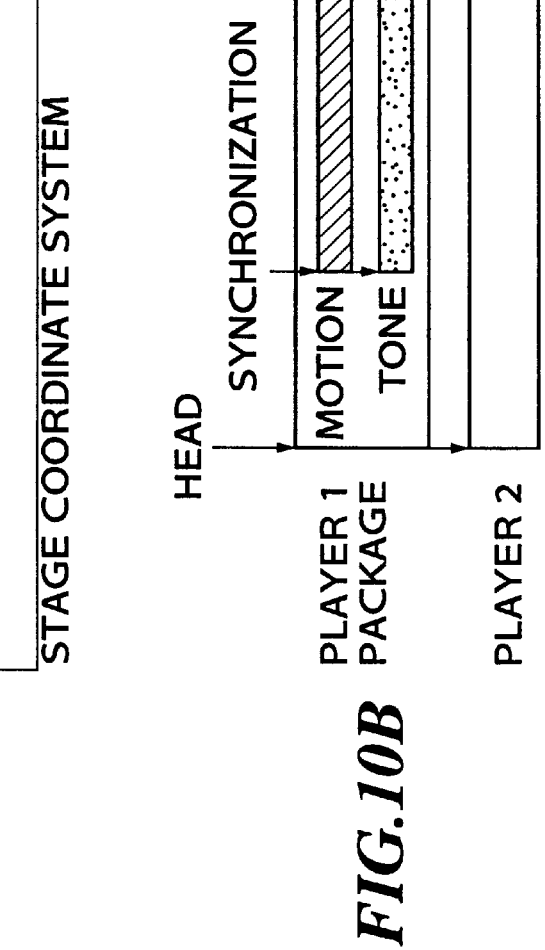

Referring next to FIGS. 10A and 10B, there will be explained the case where pieces of information on a plurality of parts are synthesized or combined together. As shown in FIG. 10A, a global stage coordinate system is established, in which a personal coordinate system of each player and a coordinate system of a musical instrument played by each player or an object having a certain skeleton structure are respectively established. The instruments and objects are classified into stationary systems and partially movable systems, and the origin of the coordinate system of each partially movable system is placed on a movable part of the system. With this arrangement, the coordinates or positions of the players and musical instruments or objects may be freely changed within the global coordinate system. In the case of a keyboard of a piano, for example, coordinate systems are established such that the origin of each coordinate system is placed on a movable part of each keyboard, and only one type of motion waveform representing the motion of any keyboard is prepared, so that common data (the only one motion waveform) can be used for all keyboards by shifting the position of the origin with respect to each of the keyboards to which the data is applied. With regard to stationary instruments or objects, the initial motion may be maintained. With regard to hand-held instruments or tools, such as drum sticks and a violin, a local coordinate system is defined within a personal coordinate system for each player, such that the origin of the local coordinate system is located on a movable part of the instrument or tool, and the operation of a corresponding motion component is reproduced on the local coordinate system. When the size of a player or an instrument of each part is changed, the ratio is calculated for each region such that the skeleton size in the motion component is corrected to a size after the change of the size.

As shown in FIG. 10B, a motion package of each player contains a musical tone produced by the player and the motion of the player, namely, performance information and motion information, that are packaged in synchronism with each other. The motion packages of respective players are then positioned with respect to the head position as indicated in FIG. 10B. In this manner, pieces of motion information of each player and musical instrument are integrated, to thus create sequence information covering all players.

Configuration of Sequence File

FIG. 11 shows the configuration of a sequence file containing the sequence data created in the manner as described above. As shown in FIG. 11, the sequence file consists of three files, i.e., (1) a scene file, (2) a personal initial information file, and (3) a personal performance descriptive file. The scene file (1) contains information relating to the whole sequence file, more specifically, contains scene information, such as a playback speed or rate, point of view, field of view, light source, background information and information instructing taking in image information from an external device, and information on the positions of coordinate systems of player and musical instrument of each part and sizes thereof. Here, the scene information, such as point of view and field of view, light source and background information, may be in the form of pointer information for designating relevant scene components contained in the scene component database. The personal initial information file (2) contains information that determines skeleton data, shape and texture of each player and musical instrument for each part. The personal performance descriptive file (3) contains a performance information file and a motion descriptive file (motion descriptive information) with respect to each part. The performance information file is in a MIDI data format (SMF), and the motion descriptive file contains pointer information that designates motion waveform data of each player or musical instrument (tool) contained in the motion component database 20, and the sounding and muting point markers as described above.

Thus, the motion descriptive file included in the sequence file of the present invention holds information that permits retrieval of desired data from the motion component database 20, rather than image information itself. This leads to reduced size and improved portability of the sequence file.

Reproduction of Sequence Data

Referring next to the flowchart of FIG. 12, a process of playing or performing the piece of music in question and displaying an image based on the sequence data thus created. A similar process to this process is also executed when a playback button is operated during the above-described operation to create sequence data.

When the operator determines a piece of music to be played, a sequence file (reproduction data) of the piece of music is selected from a song data base 21 that contains a plurality of sequence files corresponding to respective pieces of music that were created as described above. In step S41, a certain length of the sequence file (reproduction data) of the selected piece of music is read out at a time, and the operations of steps S42 and S45 are performed based on the data.

In step S46, an operation similar to a conventional automatic performance operation is performed so as to create tone-generation events such as key-on events and control changes, and sound source control parameters, based on performance information contained in the reproduction data (sequence file) read in step S41. In step S46, the sound source control parameters thus created are transmitted to the sound source unit 5, which in turn generates corresponding musical tones (step S47), and the sound system 6 then emits the musical tones.

In step S42, on the other hand, motion waveform data of each region is read from the motion component database 20, based on the motion descriptive file contained in the reproduction data (sequence file) read in step S41. The control flow then goes to step S43 to perform a correcting operation on the coordinate position of the motion waveform of each region read in step S42. At this time, where the operator selects a part to be displayed on the screen, or change the position of the point of view, the coordinate position of the relevant region is corrected according to the selection or change. More specifically, interpolation is performed on the motion waveform of each region as needed in accordance with the playback rate of the part, to thereby create motion data, and spline interpolation is performed on a connecting part or joint of successive motions. A correcting operation is then performed in which the position of each coordinate system is transferred, rotated or enlarged, for example, depending upon the position of each region. Also, scene information (stage information) is created by reading scene components designated in the scene file, from the scene component database 22.

As a result, the model position of the region in question is determined, and animation corresponding to the model position is determined in step S43.

As described above, each motion component contained in the motion component database 20 includes sounding and muting point markers as well as coordinate data along the time axis, and the coordinates of each sounding (tone-generation) point and muting (tone-elimination) point and the time or velocity from the start of reproduction of the motion waveform to the sounding or muting point may be obtained based on the sounding point marker and muting point marker. Thus, pictures and musical tones are generated in synchronism with each other, based on the sounding and muting point markers.

More specifically, when the tempo with which the piece of music is played is changed to be k times the tempo (reference tempo) with which the motion component is created, the reading frequency of the motion waveform is reduced (thinning-out) or the same motion position is read a plurality of times, so that the reproduction duration of the motion waveform is shortened or increased, thus requiring 1/k of the time (or k times the velocity) to reach from the start of reproduction of the motion waveform to the tone-generation point. Where the shift time or shift velocity is prepared for each set of coordinates, namely, where the motion component contains information on the time or velocity it takes for each region to move from certain coordinates to the next coordinates, the time may be changed (corrected) to be "1/k" of the reference time contained in the motion component, or the velocity may be changed (corrected) to be "k" times that contained in the motion component.

To simply control the time axis as described above with respect to all motions may result in unnatural or awkward images. For example, the motion velocity of the whole series of images is reduced to a half if the tempo is reduced to a half, and, in the case of performance of a drum, this change in the velocity may result in a series of images in which the player touches the drum softly, and the performance looks as if the volume were reduced. To avoid this, positions (from a sounding motion start point to a muting motion point) relating to a sounding or tone generating operation are established for recognition thereof, and the motion velocity from the sounding motion start point to the muting motion point is not changed even with a change in the tempo.

Also, the motion waveform may be modified by use of sound source control parameters, such as an envelope or velocity, generated in the above sound source control parameter generating step S46. Where the motion component in question represents a swinging motion of a cymbal, for example, the swinging motion of the cymbal may be controlled based on musical tone control parameters, such as the velocity or track volume. For example, the motion waveform may be created such that the degree or magnitude of swinging of the cymbal is increased with an increase in the velocity or track volume, and reduced with a reduction in the velocity or track volume. Thus, a natural manner of playing music can be displayed.

The control flow then goes to step S44 in which an image generating operation (rendering) is performed on the information determined in step S43. Namely, a scene is visualized based on the scene information and motion waveform. More specifically, a 3D animation image or picture is created based on the scene information and motion waveform, by performing operations such as three-dimensional coordinate calculation with respect to the vertex and normal of each object, illumination and coloring, texture coordinate calculation, polygon formation, projection coordinate calculation, field-of-view clipping, bit map generation, and hidden-surface/transparency processing, and the 3D animation image thus created is delivered to a frame buffer.

On this occasion, if the size of the player or musical instrument actually displayed differs from the size of the player or musical instrument previously prepared, the ratio is calculated for each region, to thereby correct the coordinate information and hence correct the difference in the skeleton size.

Further, if the control signal for taking in images from the image/picture input device 13 as scene information is pasted on the time schedule as described above, an actual image or a like image is input from the image/picture input device 13 in timing designated by the scene information, and the input image is synthesized with an image created by the image generating operation as needed, and delivered to the frame buffer.

Furthermore, if the scene information contains any effects-applying process for applying effects to the image, step S45 is executed to apply visual effects to the image created in step S44.

In the manner as described above, the manner of playing music or the state of performance can be displayed in the form of images in synchronism with the performance of music. Also, the output from the display can be stored as motion picture data.

While candidates of motion components are contained in the motion component database 20 such that an appropriate one of the candidates can be retrieved and generated upon entry of a music piece and the performance method in the illustrated embodiment, musical notation rules and symbols may be newly defined that are associated with the respective motion components in the database, so that an image can be automatically formed at the same time that a score is created using the notation rules and symbols.

It is to be understood that the object of the present invention may also be accomplished by supplying a system or an apparatus with a storage medium in which a software program that realizes the functions of the illustrated embodiment is recorded, and causing a computer (CPU 1 or MPU) of the system or apparatus to read out and execute the program stored in the storage medium.

In this case, the program itself read from the storage medium accomplishes the novel functions of the present invention, and thus the storage medium storing the program constitutes the present invention.

The storage medium for supplying the above-described program to the system or apparatus may be selected from a hard disc mounted in the external storage device 9, CD-ROM, MO, MD, DVD, floppy disc, CD-R (CD-Recordable), magnetic tape, non-volatile memory card, ROM, and so forth. The program may also be supplied from the server computer 102 via the communication network 101.

The functions of the illustrated embodiment may be accomplished not only by executing a program read by a computer, but also by causing an operating system (OS) that operates on the computer, to perform a part or the whole of the actual operations according to instructions of the program.

Furthermore, the program read from the storage medium may be written into a memory provided in an expanded board inserted in the computer, or an expanded unit connected to the computer, and a cpu, or the like, provided in the expanded board or expanded unit may actually perform part or all of the operations according to the instructions of the program, so as to accomplish the functions of the illustrated embodiment.

What is claimed is:

1. A performance image information creating apparatus for creating performance image information for displaying an image showing a manner of playing a piece of music while playing the piece of music, comprising:

a motion component database that stores a plurality of motion components each of which corresponds to a performance method and performance information, each of said motion components representing a trajectory of a fraction of performance motion of both a musical instrument and a player of said musical instrument;

an information generating-device that generates motion component information designating at least one of said motion components in accordance with a performance method and performance information on a time schedule determined by a predetermined musical time unit of music to be played, said performance method representing how to perform said music and said performance information being information for performance of said music; and a sequence information creating device that creates sequence information comprising said motion component information and said performance information.

2. A performance image information creating apparatus according to claim 1, wherein said predetermined musical time unit is defined by beats of music to be played.

3. A performance image information creating apparatus according to claim 1, wherein said predetermined musical time unit is defined by bars or measures of music to be played.

4. A performance image information creating apparatus according to claim 1, wherein said information generating device includes an editing device that edits the designated one of the motion components, and stores a result of editing in the motion component database as an edited motion component.

5. A performance image information creating apparatus according to claim 1, wherein the motion components each comprise rewarded information on the trajectory of the fraction of motion of at least one of each part of a body of the player and each part of the musical instrument.

6. A performance image information creating apparatus according to claim 1, wherein the motion components each comprise a motion waveform representing the trajectory of the fraction of motion, a sounding point marker indicative of timing of tone generation, and a muting point marker indicative of timing of tone elimination.

7. A performance image information creating apparatus according to claim 1, further including a time resolution setting device that individually sets time resolutions of waveforms of motion of the motion components.

8. A performance image information creating apparatus according to claim 1, further including a scene information creating device that creates scene information comprising scene components including at least background information and light source information in said image, said scene components being arranged on said time schedule, and wherein said sequence information comprises said performance information, said motion component information, and said scene information.

9. A performance image information creating apparatus according to claim 8, wherein said scene components include information for instructing information externally entered to be displayed.

10. A method of creating performance image information for displaying an image showing a manner of playing a piece of music while playing the piece of music, comprising the steps of:

creating a motion component database that stores a plurality of motion components each of which corresponds to a performance method and performance information, each of said motion components representing a trajectory of a fraction of performance motion of both a musical instrument and a player of said musical instrument;

creating motion component information designating at least one of said motion components in accordance with a performance method and performance in formation on a time schedule determined by a predetermined musical time unit of music to be played, said performance information being information for performance of said music; and creating sequence information comprising said motion component information and said performance information.

11. A storage medium storing a program that is executable by a computer to practice a method of creating performance image information for displaying an image showing a manner of playing a piece of music while playing the piece of music, the program comprising:

a module for creating a motion component database that stores a plurality of motion components each of which corresponds to a performance method and performance information, each of said motion components representing a trajectory of a fraction of performance motion of both a musical instrument and a player of said musical instrument;

a module for creating motion component information designating at least one of said motion components in accordance with a performance method and performance in formation on a time schedule determined by a predetermined musical time unit of music to be played, said performance information being information for performance of said music; and a module for creating sequence information comprising said motion component information and said performance information.

12. A performance image information creating apparatus for creating performance image information for displaying an image in synchronism with playing of a piece of music while playing the piece of music, comprising:

an information creating device that creates information comprising instruction information arranged on a time schedule determined by a predetermined musical time unit of the piece of music to be played, for instructing image information externally entered to be displayed; and a sequence information creating device that creates sequence information comprising said information created by said information creating device, and performance information on the piece of music to be played.

13. A performance image information creating apparatus according to claim 12, wherein said predetermined musical time unit is defined by beats of the piece of music to be played.

14. A performance image information creating apparatus according to claim 12, wherein said predetermined musical time unit is defined by bars or measures of the piece of music to be played.

15. A performance image information creating apparatus according to claim 12, wherein said instruction information includes information for controlling visual effects to be applied to said image information externally entered.

16. A performance image information creating apparatus comprising:

an information creating device that creates information comprising instruction information arranged on a time schedule determined by a predetermined musical time unit of the piece of music to be played, for instructing image information externally entered to be displayed;

a sequence information creating device that creates sequence information comprising said information created by said information creating device, and performance information on the piece of music to be played; and a motion component information creating device that creates motion component information comprising designation information arranged on said time schedule, for designating one of a plurality of motion components each storing a trajectory of a fraction of motion of a player and a musical instrument, said one of the plurality of motion components corresponding to said performance information and a performance method being typical of said musical instrument, and wherein said sequence information comprises said information comprising said instruction information, and said motion component information.

17. A method of creating performance image information for displaying an image in synchronism with playing of a piece of music while playing the piece of music, comprising the steps of:

creating information comprising instruction information arranged on a time schedule determined by a predetermined musical time unit of the piece of music to be played, for instructing image information externally entered to be displayed; and creating sequence information comprising said information created by said step of creating information, and performance information on the piece of music to be played.

18. A storage medium storing a program that is executable by a computer to practice a method of creating performance image information for displaying an image in synchronism with playing of a piece of music while playing the piece of music, the program comprising:

a module for creating information comprising instruction information arranged on a time schedule determined by a predetermined musical time unit of the piece of music to be played, for instructing image information externally entered to be displayed; and a module for creating sequence information comprising said information created by said module for creating information, and performance information on the piece of music to be played.

19. A performance image information reproducing apparatus for generating musical tones corresponding to performance information and displaying an image showing a manner of playing a piece of music represented by the performance information, based on sequence information comprising the performance information, and motion component information used for displaying the image showing the manner playing the piece of music, comprising:

a musical tone generating device that generates the musical tones based on the performance information;

an image creating device that creates the image showing the manner of playing the piece of music corresponding to the performance information, based on the motion component information; and a motion component database that stores a plurality of motion components each of which corresponds to a performance method and performance information, each of said motion components representing a trajectory of a fraction of performance motion of both a musical instrument and a player of said musical instrument;

wherein said image creating device reads out the motion components from said motion component database, based on the motion component information, and creates the image using the motion components read from the motion component database.

20. A performance image information reproducing apparatus according to claim 19, wherein said image creating device creates the image to be displayed, by correcting skeleton data indicative of sizes of the player and the musical instrument contained in each of the motion components, based on information contained in the sequence information, for designating a size of the image to be displayed.

21. A performance image information reproducing apparatus according to claim 19, further including:

an input device that enters image information from an external device;

an image synthesizing device that synthesizes an image based on the image created by the image creating device and an image based on the image information entered by the input device; and an effects-applying device that applies visual effects to at least one of the image created by the image correcting device, the image based on the image information entered by the input device, and the image synthesized by said image synthesizing device, in timing determined by a predetermined time unit of the piece of music being played, based on the sequence information.

22. A method of reproducing performance image information for generating musical tones corresponding to performance information and displaying an image showing a manner of playing a piece of music represented by the performance information, based on sequence information comprising the performance information, and motion component information used for displaying the image showing the manner playing the piece of music, comprising the steps of:

generating the musical tones based on the performance information; creating the image showing the manner of playing the piece of music corresponding to the performance information, based on the motion component information; and creating a motion component database that stores a plurality-of motion components each of which corresponds to a performance method and performance information, each of said motion components representing a trajectory of a fraction of performance motion of both a musical instrument and a player of said musical instrument;

wherein said step of creating the image reads out the motion components from said motion component database, based on the motion component information, and creates the image using the motion components read from the motion component database.

23. A storage medium storing a program that is executable by a computer to practice a method of reproducing performance image information for generating musical tones corresponding to performance information and displaying an image showing a manner of playing a piece of music represented by the performance information, based on sequence information comprising the performance information, and motion component information used for displaying the image showing the manner playing the piece of music, the program comprising:

a module for generating the musical tones based on the performance information;

a module for creating the image showing the manner of playing the piece of music corresponding to the performance information, based on the motion component information; and a module for creating a motion component database that stores a plurality-of motion components each of which corresponds to a performance method and performance information, each of said motion components representing a trajectory of a fraction of performance motion of both a musical instrument and a player of said musical instrument;

wherein said module for creating the image reads out the motion components from said motion component database, based on the motion component information, and creates the image using the motion components read from the motion component database.

24. A performance image information creating apparatus for creating performance image information for displaying an image showing a manner of playing a piece of music while playing the piece of music, comprising:

a motion component database that stores a plurality of motion components each of which corresponds to a performance method, each of said motion components representing a trajectory of a fraction of performance motion of both a musical instrument and a player of said musical instrument; and a sequence information creating device that creates sequence information comprising designation information arranged on a time schedule determined by a musical time unit of performance information, for designating one of the motion components stored in said motion component database, said motion component being designated in accordance with a performance method determined by said performance information.

\* \* \* \* \*